United States Patent
Henmi et al.

(10) Patent No.: US 6,438,316 B1
(45) Date of Patent: *Aug. 20, 2002

(54) RECORDING/REPRODUCING APPARATUS AND METHOD FOR INCLUDING LINE NUMBERS

(75) Inventors: Fumiaki Henmi; Tetsuo Kani; Yoshihiro Murakami; Takao Inoue; Shoji Kosuge; Minoru Kawahara; Makoto Toyoshima; Kenji Uehara, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,659

(22) Filed: Dec. 1, 1998

Related U.S. Application Data

(63) Continuation of application No. PCT/JP98/01522, filed on Apr. 2, 1998.

(30) Foreign Application Priority Data

Apr. 3, 1997 (JP) ............................................. 9-085102

(51) Int. Cl.[7] ................................................. H04N 5/91
(52) U.S. Cl. ..................... 386/95; 386/124; 375/240.26; 348/478
(58) Field of Search ................................. 386/27, 33–34, 386/109, 111–112, 131, 95, 124; 375/240.26, 240.01; 348/453, 476–479, 420, 473, 563–564, 468, 423; H04N 5/91

(56) References Cited

U.S. PATENT DOCUMENTS

| | | | | |
|---|---|---|---|---|
| 4,626,912 A | * | 12/1986 | Wilkinson | 358/141 |
| 4,853,796 A | * | 8/1989 | Suesada et al. | 358/324 |
| 5,594,598 A | * | 1/1997 | Shikakura | 360/49 |
| 5,633,726 A | * | 5/1997 | Timmermans | 386/70 |
| 5,712,689 A | * | 1/1998 | Yasuki et al. | 348/561 |
| 5,835,674 A | * | 11/1998 | Timmermans | 386/125 |
| 5,844,615 A | * | 12/1998 | Nuber et al. | 348/423 |
| 5,848,220 A | * | 12/1998 | Henmi et al. | 386/109 |

* cited by examiner

Primary Examiner—Vincent Boccio
(74) Attorney, Agent, or Firm—Frommer Lawrence & Haug LLP; William S. Frommer; Joe H. Shallenburger

(57) ABSTRACT

A line number LN is extracted from serial data corresponding to BTA S-004 standard. The line number LN is placed as LN0 and LN1 to each of a luminance signal Y and color difference signals Pr/Pb of a 4:2:2 signal. The 4:2:2 signal is converted into a 3:1:1 signal by a bandwidth-compressing means. In addition, the 3:1:1 signal is re-arranged to two-channel signals Ch0 and Ch1 with the same format at a transmission rate of 46.40625 MHz. Thereafter, the, signals are processed at the transmission rate of 46.40625. The line number LN is placed as LN0 and LN1 at the beginning of one horizontal interval.

9 Claims, 12 Drawing Sheets

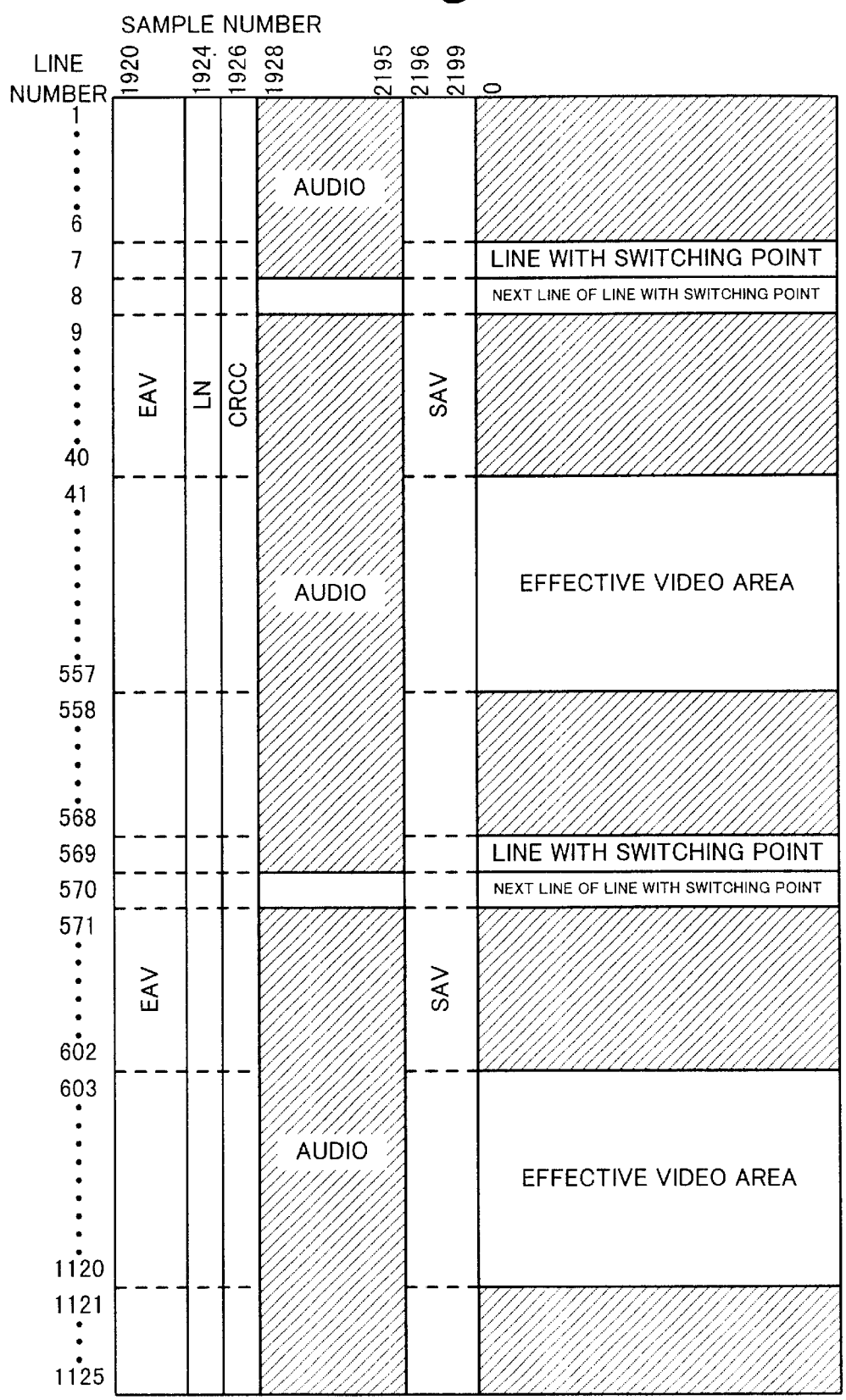

Fig. 8

|      | LN0 | LN1      |
|------|-----|----------|
| MSB  | L7  | FLD      |
|      | L6  | NOT USED |
|      | L5  | NOT USED |
|      | L4  | NOT USED |
|      | L3  | NOT USED |
|      | L2  | L10      |
|      | L1  | L9       |
| LSB  | L0  | L8       |

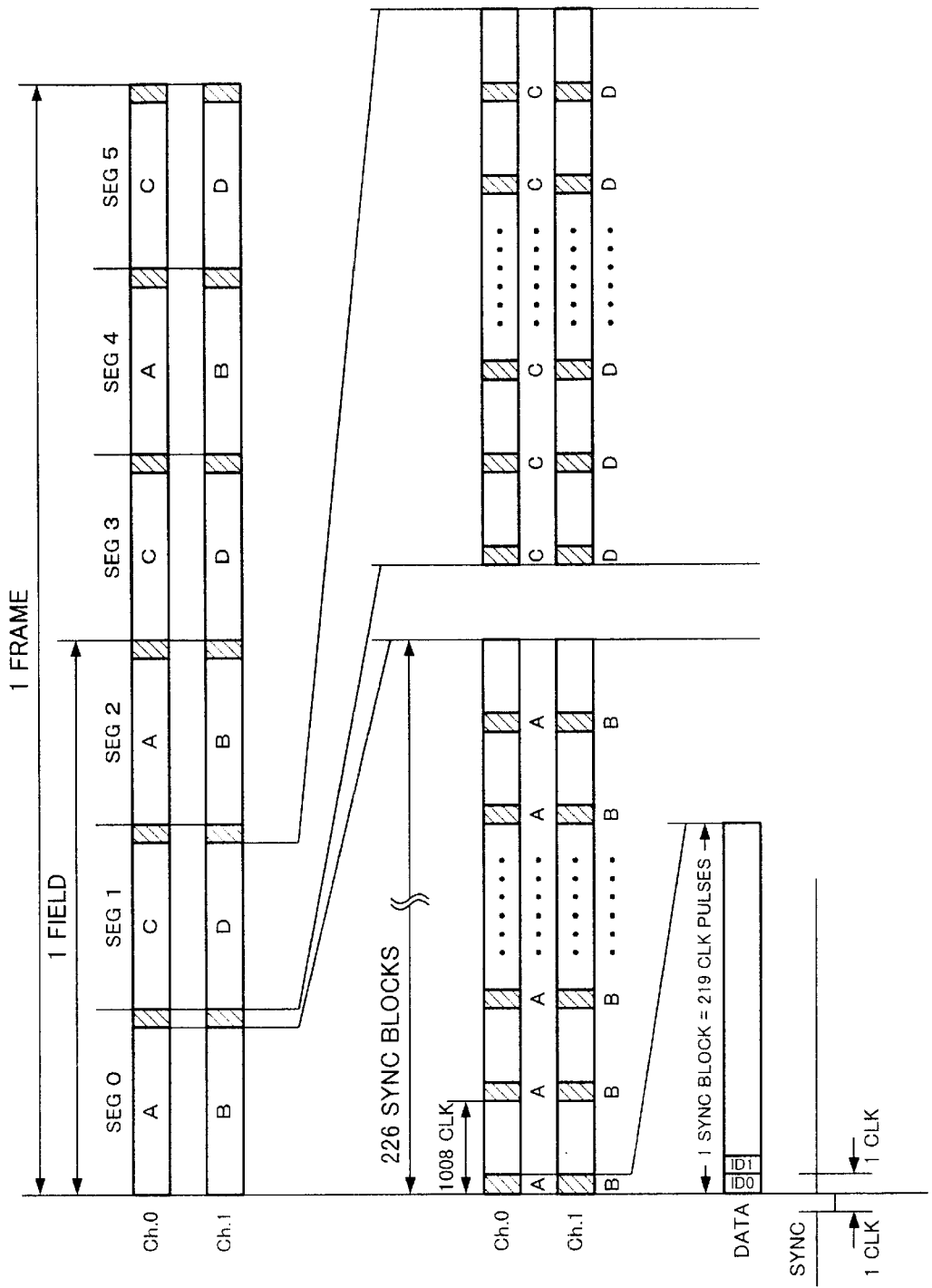

4: MAGNETIC TAPE

12: COPROCESSOR

13: INPUT FILTER 18, 19: BRR ENCODER

22: ECC ENCODER

30: TIMING GENERATOR 41, 48: ECC DECODER 43, 50: BRR DECODER

45: CONCEALING CIRCUIT

55: OUTPUT FILTER

LN: LINE NUMBER

RECORDING/REPRODUCING APPARATUS AND METHOD FOR INCLUDING LINE NUMBERS

This is a continuation of copending International Application PCT/JP98/01522 having an international filing date of Apr. 2, 1998.

TECHNICAL FIELD

The present invention relates to a recording/reproducing apparatus for bandwidth-compressing a video signal and a method thereof, in particular, to a recording/reproducing apparatus suitable for a portable digital video tape recorder with a built-in camera.

RELATED ART

In a signal processing apparatus that digitally processes a video signal (for example, a signal processing apparatus for use with a high resolution portable digital video tape recorder with a built-in camera), a record time and a record density should be considered. Thus, an input video signal is compression-encoded. The resultant video signal is recorded to for example a video tape.

When the signal is recorded to the video tape, the signal is often encoded with a product code so as to correct an error. In the encoding process with the product code, data is arranged in a matrix shape symbol by symbol (for example, byte by byte). The arranged data is encoded in the column direction with for example Reed Solomon code. Thus, an outer code parity is generated. The data and the outer code parity are encoded in the line direction. Thus, an inner code parity is generated. With the outer code parity in the column direction and the inner code parity in the line direction, the data is encoded with the product code as an error correction code. In this case, the time sequence of the data accords with for example the line direction.

On the other hand, in the portable digital video tape recorder with the built-in camera, the power consumption and hardware scale should be considered. To satisfy energy saving that is a worldwide requirement, the power consumption of a desk top unit should be considered.

A video signal photographed by a video camera is output as a 4:4:4 signal from a CCD (Charge Coupled Device). In the 4:4:4 signal, the ratio of sampling frequencies of R (Red), G (Green), and B (Blue) is 4:4:4. In a video signal of HDVS (High Definition Video System) that provides a high resolution picture, 2200×1125 pixels (1920×1035 effective pixels)/(30 frames per second) is accomplished. The sampling frequency of each of RGB components is as high as 74.25 MHz. In this case, the field frequency is 60 Hz.

When this signal is supplied to a digital video tape recorder portion, the signal is converted into a 4:2:2 signal of which the ratio of sampling frequencies of a luminance signal Y, an R-Y color difference signal Pr, and a B-Y color difference signal Pb is 4:2:2. In the 4:2:2 signal, the signals Y, Pr, and Pb are transmitted in parallel at the above-described sampling frequency (74.25 MHz) corresponding to BTA S-002 standard. In this case, the rate of the luminance signal Y is still 74.25 MHz.

Since the power consumption necessary for processing a signal is proportional to the frequency, a high power is required. In addition, since the data rate is high, the data amount is large and the hardware scale becomes large.

On the other hand, when a signal is lost or changed outside the apparatus or when the apparatus gets defective, a discontinuous line may take place. In the conventional apparatus, there is no means for obtaining the transmission order of lines. Due to such a discontinuity of a signal, the length of a blanking portion may vary. In addition, even if the position of a picture deviates, there is no means for compensating it.

DISCLOSURE OF THE INVENTION

Thus, an object of the present invention is to provide a recording/reproducing apparatus and a method that allow a discontinuous point of a line that has been processed to be easily compensated.

Another object of the present invention is to provide a recoding/reproducing apparatus and a method that allow a hardware scale and power consumption to be decreased.

The present invention is a recording apparatus for bandwidth-compressing a digital video signal, compression-encoding the resultant signal, and recording the resultant signal to a record medium, comprising a compression-encoding means for compression-encoding a supplied digital video signal, wherein line numbers are added to the digital video signal supplied to the compression-encoding means.

The present invention is a reproducing apparatus for reproducing a digital video signal that has been bandwidth-compressed, compression-encoded, and recorded to a record medium, comprising a decoding means for decoding compressed code of a reproduction digital video signal reproduced from the record medium, wherein line numbers generated corresponding to the reproduction digital video signal are added to an output signal of the decoding means.

The present invention is a recording/reproducing apparatus for bandwidth-compressing a digital video signal, compression-encoding the resultant signal, recording the resultant signal to a record medium, and reproducing the recorded digital video signal, comprising a compression-encoding means for compression-encoding a supplied digital video signal, a recording means for recording the compression-encoded digital video signal to the record medium, a reproducing means for reproducing the digital video signal recorded on the record medium, and a decoding means for decoding compressed code of the reproduction digital video signal reproduced from the record medium, wherein in a recording mode, line numbers are added to the digital video signal supplied to the compression-encoding means and in a reproducing mode, line numbers generated corresponding to the reproduction digital video signal are added to an output signal of the decoding means.

The present invention is a recording method for bandwidth-compressing a digital video signal, compression-encoding the resultant signal, and recording the resultant signal to a record medium, comprising the step of compression-encoding a supplied digital video signal, wherein line numbers are added to the digital video signal supplied at the compression-encoding step.

The present invention is a reproducing method for reproducing a digital video signal that has been bandwidth-compressed, compression-encoded, and recorded to a record medium, comprising the step of decoding compressed code of a reproduction digital video signal reproduced from the record medium, wherein line numbers generated corresponding to the digital video signal are added to an output signal at the decoding step.

The present invention is a recording/reproducing method for bandwidth-compressing a digital video signal, compression-encoding the resultant signal, recording the resultant signal to a record medium, and reproducing the recorded digital video signal, comprising the steps of compression-encoding a supplied digital video signal, recoding the compression-encoded digital video signal to the record medium, reproducing the digital video signal recorded to the record medium, and decoding compressed code of the reproduction digital video signal reproduced from the record medium, wherein in a recording mode, line numbers are added to the digital video signal supplied at the compression-encoding step and in a reproducing mode, line numbers generated corresponding to the reproduction digital video signal are added to an output signal at the decoding step.

As described above, according to the present invention, in the recording mode, a line number is added to a digital video signal supplied to the compression-encoding means. In the reproducing mode, a line number is added to a digital video signal that is output from the decoding means that decodes a signal that has been compression-decoded. Thus, even if line numbers become discontinue, they can be easily compensated.

BRIEF DESCRIPTION OF DRAWINGS

FIG. 6 is a schematic diagram showing a transmission format of a serial digital A/V signal;

FIG. 8 is a schematic diagram showing an example of a bit assignment of line numbers $LN_0$ and $LN_1$;

FIG. 9 is a schematic diagram showing a signal format used in an interface between a BRR encoder and an ECC encoder;

BEST MODES FOR CARRYING OUT THE INVENTION

Figure 1:
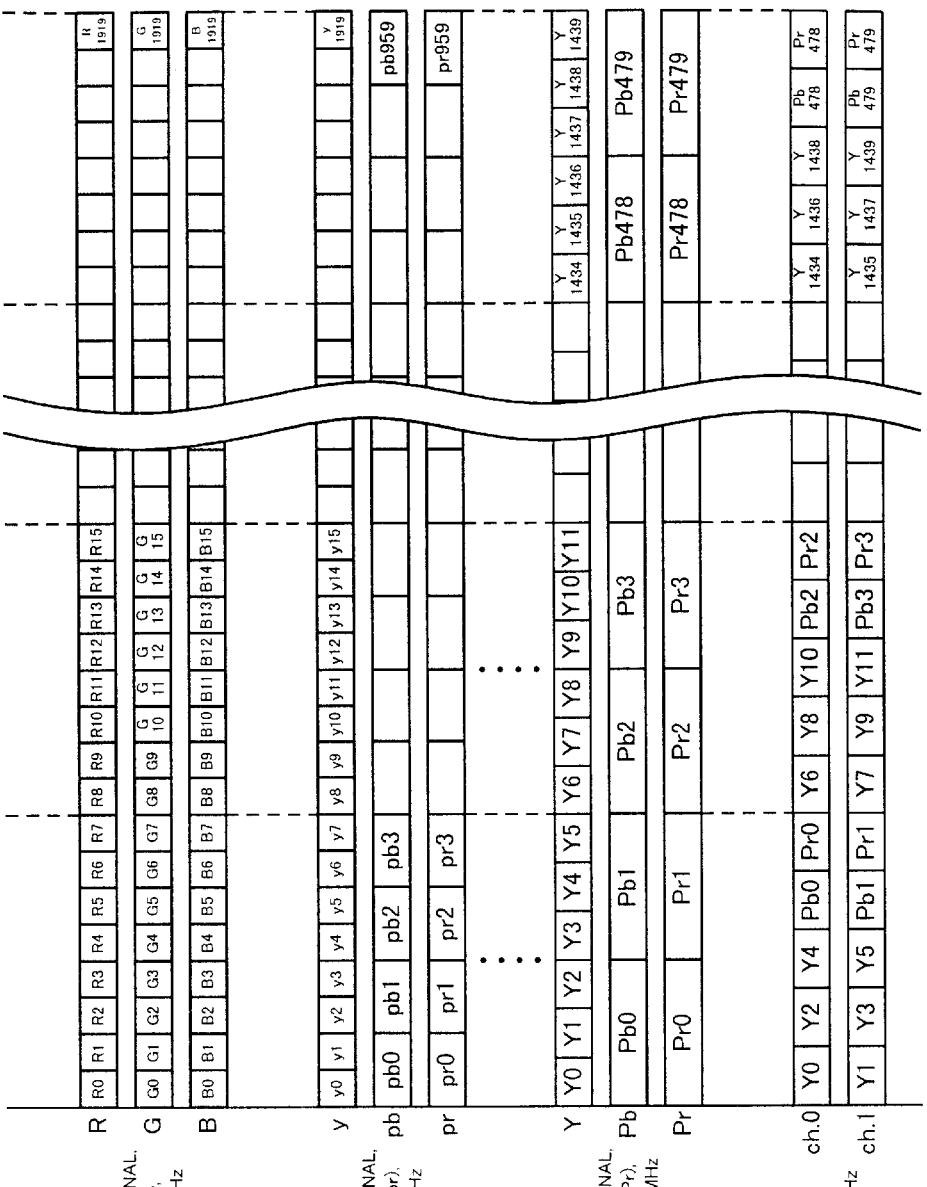
FIG. 1 is a schematic diagram showing a video signal handled in the present invention.

Next, with reference to the accompanying drawings, an embodiment of the present invention will be described. FIG. 1 is a schematic diagram showing a video signal handled in the present invention. In this example, it is assumed that a video signal of the above-described HDVS 1125 lines/60 Hz system is handled.

A video signal that is output from a CCD is a 4:4:4 signal with a sampling frequency of 74.25 MHz and of which a red signal R, a green signal G, and a blue signal B are transmitted in parallel as shown in FIG. 1A. The parallel signal has a data width of eight bits. One pixel is composed of a set of $R_n$, $G_n$, and $B_n$. Data of one pixel is transmitted corresponding to a clock signal with a sampling frequency of 74.25 MHz. The 4:4:4 signal is converted into a 4:2:2 signal (see FIG. 1B). The 4:2:2 signal is also converted into a 3:1:1 signal with a sampling frequency of 55.6875 MHz (see FIG. 1C).

As shown in FIG. 1D, the 3:1:1 signal is converted into two-channel signals of which a luminance signal Y and color difference signals Pr and Pb are arranged in series. Hereinafter, the two-channel signals are referred to as a signal Ch0 and a signal Ch1. The sampling frequency of these signals Ch0 and Ch1 is 46.40625 MHz (=74.25 MHz×5/8).

Thus, the sampling frequency of the original signal is decreased from 74.25 MHz to 46.40625 MHz. In addition, the sampling frequencies of the luminance signal Y and the color difference signals Pr and Pb are the same. Consequently, the signals can be processed with a single clock frequency.

In addition, according to the present invention, a line number LN is placed in the signals Ch0 and Ch1. Along with data, the line number LN is transmitted to each structural portion that processes a signal. When a signal is processed, the line number LN is referenced so as to control an address of a memory and a data sequence. Thus, even if a line sequence becomes discontinuous due to any cause, the line sequence can be compensated.

Next, as an example of the present invention, a digital video tape recorder that records and reproduces a digital video signal to/from a magnetic tape will be described. In the digital video tape recorder, helical scan system and azimuth system are used. In the helical scan system, inclined tacks are formed on a magnetic tape by pairs of magnetic heads disposed on a rotating drum. In the azimuth system, adjacent tracks are formed by the pairs of magnetic heads with different azimuth angles.

Figure 2:
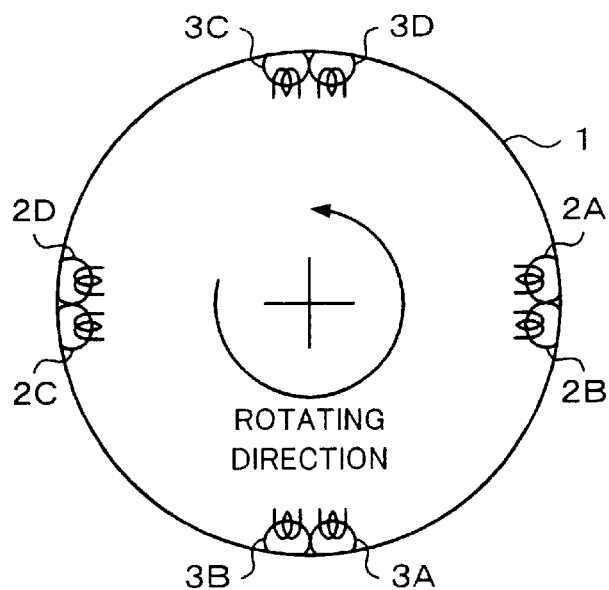
FIG. 2 is a schematic diagram showing an example of a recording system for a magnetic tape.
Figure 3:
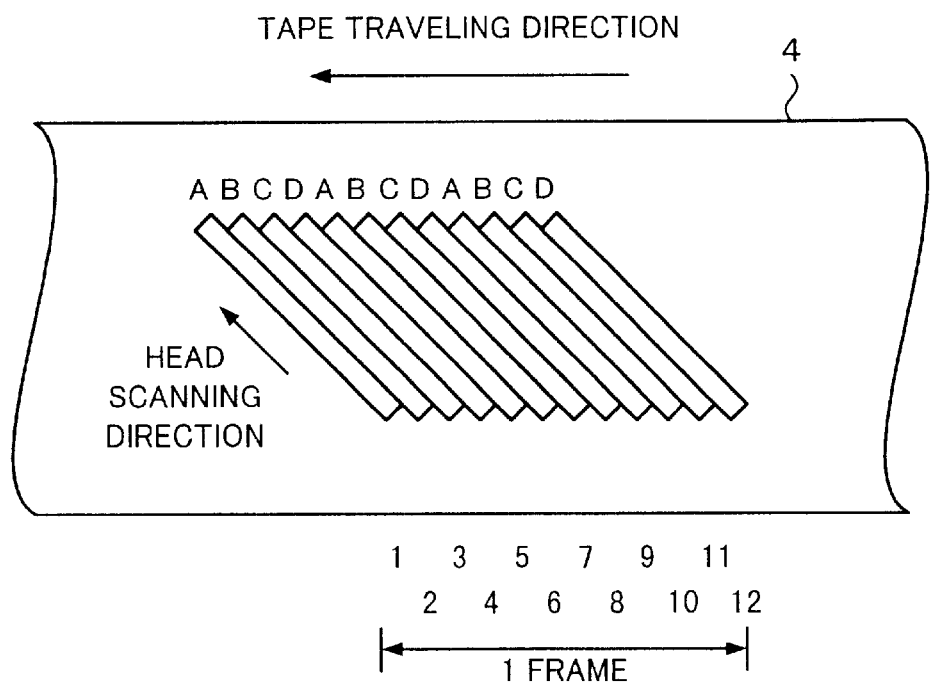
FIG. 3 is a schematic diagram showing an example of a recording system for a magnetic tape.

FIGS. 2 and 3 show examples of the helical scan system and the azimuth system. As shown in FIG. 2, four recording heads 2A, 2B, 2C, and 2D are disposed on a rotating head 1. Two of the magnetic heads 2A, 2B, 2C, and 2D are paired. The paired magnetic heads are oppositely disposed. The azimuth angles of the magnetic heads 2A and 2C that are oppositely disposed are the same. The azimuth angles of the magnetic heads 2B and 2D that are oppositely disposed are the same. Thus, the azimuth angle of the magnetic head 2A is different from the azimuth angle of the magnetic head 2B. The azimuth angle of the magnetic head 2C is different from the azimuth angle of the magnetic head 2D.

A magnetic tape is wound around the rotating drum 1 with a winding angle of for example 180°. Whenever the rotating drum 1 is rotated by 180°, a signal supplied to one of opposite magnetic heads is switched to the other. This point is referred to as switching point. Thus, when channels corresponding to these magnetic heads are denoted by A, B, C, and D, tracks A and B and tracks C and D are formed by the paired magnetic heads 2A and 2B and the paired magnetic heads 2C and 2D, respectively, as shown in FIG. 3.

The azimuth angle of the track A is the same as the azimuth angle of the track C. The azimuth angle of the track B is the same as the azimuth angle of the track D. One segment is composed of adjacent two tracks (channels A and B or channel C and D). One frame of a video signal is composed of 12 tracks. Thus, one frame of a video signal is composed of six segments. The six segments are denoted by segments 0 to 5. Four-channel video data is disposed in such a manner that it is sandwiched with video data at the center of tracks.

In addition, reproducing magnetic heads 3A, 3B, 3C, and 3D are disposed on the rotating drum 1. The relation of the positions and azimuth angles of the magnetic heads 3A, 3B, 3C, and 3D is the same as that of the magnetic heads 2A, 2B, 2C, and 2D. When data is reproduced from a magnetic tape, the magnetic heads 3A, 3B, 3C, and 3D are used.

Figure 4:
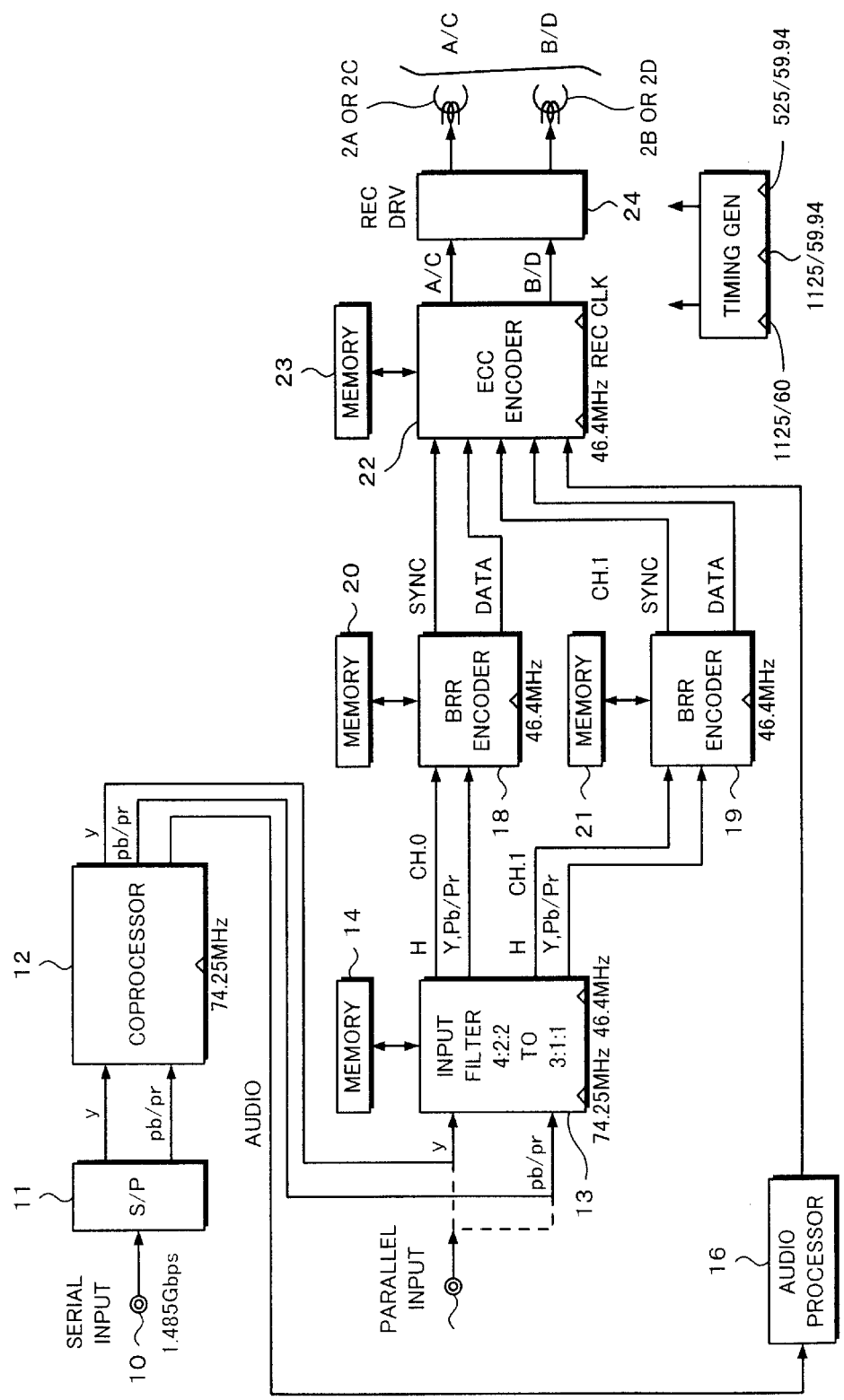
FIG. 4 is a block diagram showing an example of the structure of a recording system of a digital video tape recorder.
Figure 5:
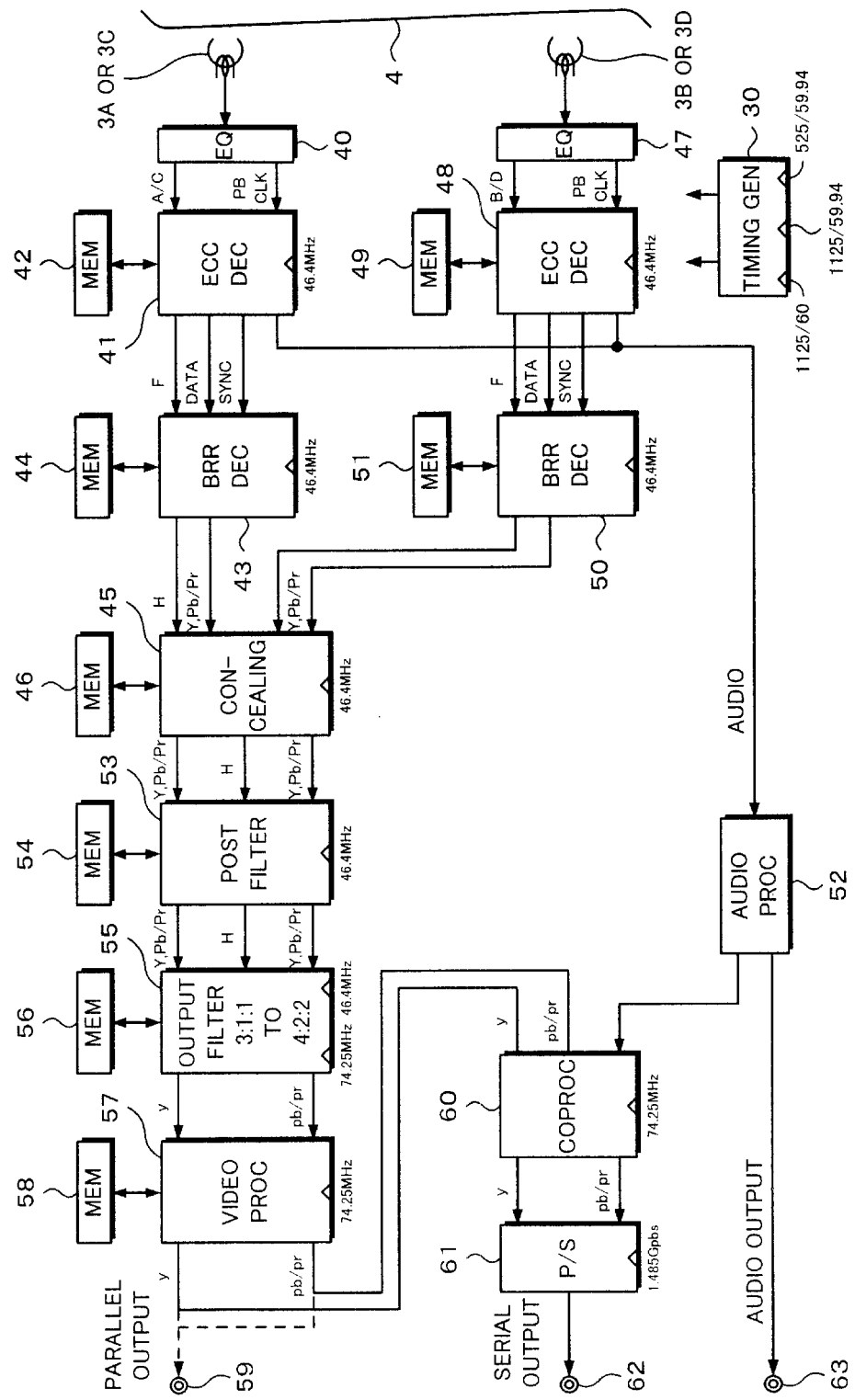
FIG. 5 is a block diagram showing an example of the structure of a reproducing system of the digital video tape recorder.

FIGS. 4 and 5 are block diagrams showing an example of the structure of the digital video tape recorder. FIG. 4 shows an example of the structure of a recording system of the digital video tape recorder. FIG. 5 shows an example of the structure of a reproducing system of the digital video tape recorder. Part of the structures of the recording system and the reproducing system can be used in common. In the digital video tape recorder, it is assumed that the above-described HDVS video signal is handled.

In the structure of the recording system shown in FIG. 4, a serial digital A/V signal at a transmission rate of 1.485 Gbps (bits per per) corresponding to BTA S-004 standard is input to an input terminal 10. FIG. 6 is a schematic diagram showing a transmission format of the serial digital A/V signal. Numbers represented in the vertical direction show line numbers. Numbers represented in the horizontal direction show sample numbers. In the ascending order of line numbers, data is transmitted in the ascending order of video sample numbers. Video data and audio data for one frame are transmitted with 2200 samples in the horizontal direction and 1125 lines in the vertical direction.

In the horizontal direction, 1920 samples from 0th to 1919th samples are used for an effective video area. With lines other than vertical blanking intervals, a video signal is transmitted. SAV that represents the beginning of the effective video area is placed from 2196th to 2199th samples. EAV that represents the end of the effective video area is placed from 1920th to 1923rd samples. An audio signal is transmitted with 268 samples from 1928th to 2195th samples. A line number LN is placed in the 1924th and 1925th samples. A check bit of CRCC (Cyclic Redundancy Check Codes) of the current line is placed in the 1926th and 1927th samples.

In the vertical direction, the 1st to 40th lines, the 558th to 602nd lines, and the 1121st to 1125th lines are vertical blanking intervals. A video signal for one field is transmitted with the 0th to 1919th samples in the 41st to 557th lines and the 603rd to 1120th lines.

As shown in FIG. 6, an audio signal is transmitted except for the next line of a line with the switching point.

The recording system has a timing generator 30 that supplies a system clock corresponding to an applicable system such as 1125 lines/60 Hz system, 1125 lines/59.94 Hz system, or 525 lines/59.94 Hz system. Corresponding to the system clock, the timing generator 30 generates clock signals necessary for the recording system shown in FIG. 4. In other words, the timing generator 30 generates a horizontal synchronous signal Hsync, a frame synchronous signal Fsync, and so forth. In this example, the timing generator 30 generates clock signals of 74.25 MHz and 46.4 (46.40625) MHz.

A serial signal supplied to an S/P converter 11 is converted into a parallel signal at a transmission rate of 74.25 MHz. The parallel signal is a 4:2:2 signal. In the 4:2:2 signal, the ratio of the bandwidth of the frequencies of a luminance signal Y and color difference signals Pr and Pb is 4:2:2. The data widths of the luminance signal Y and the color difference signals Pr and Pb are eight bits, each. The 4:2:2 signal is supplied to a coprocessor 12. The coprocessor 12 is composed of for example one ASIC (Application Specific Integrated Circuit).

The coprocessor 12 processes the parallel signal so as to separates the 4:2:2 signal into a digital audio signal, a line number LN, a CRCC detection code, SAV, and EAV. The digital audio signal is supplied to an audio signal processing circuit 16. The remaining data that is the line number LN, the CRCC detection code, the SAV, and the EAV is added to the 4:2:2 signal at each horizontal interval.

Figures 7A, 7B:
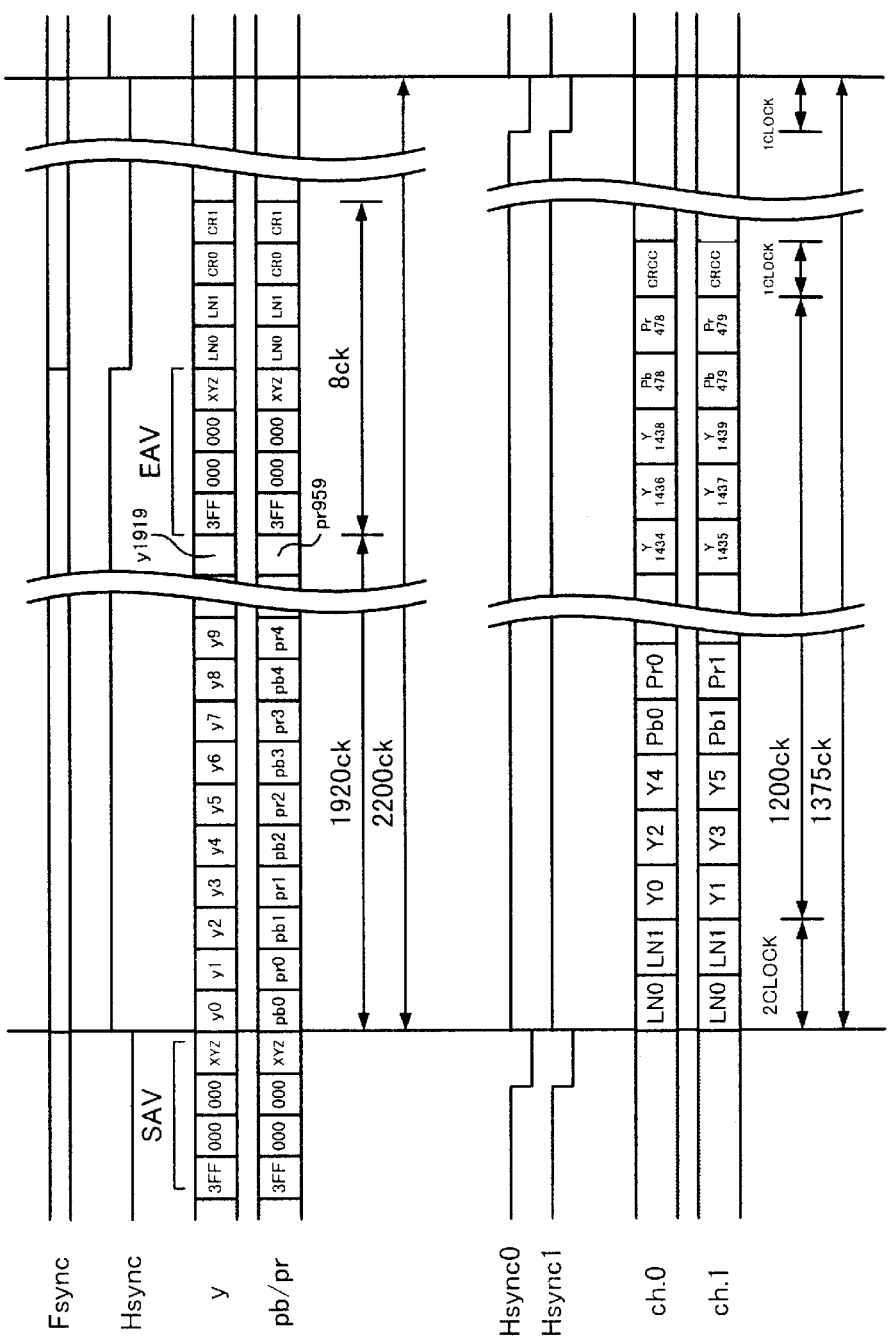
FIG. 7 is a schematic diagram showing a signal format used in an interface between ASICs.

FIG. 7A is a schematic diagram showing a 4:2:2 signal of which data such as a line number is added by the coprocessor 12. The luminance signal Y is successively transmitted corresponding to the clock signal of 74.25 MHz. On the other hand, since each of the color difference signals Pr and Pb has been bandwidth-compressed, the data amount is halved. For example, the luminance signals $Y_0$ and $Y_1$ correspond to the color difference signals $Pb_0$ and $Pr_0$, respectively. The luminance signals $Y_2$ and $Y_3$ correspond to the color difference signals $Pb_1$ and $Pr_1$, respectively.

Corresponding to Hsync supplied from the timing generator 30, the SAV and the EAV are placed for four clock pulses each at the beginning and the end of 1920 clock pulses that represent the effective video area of the 4:2:2 signal, respectively. Line numbers $LN_0$ and $LN_1$ generated corresponding to the line number LN are placed after the EAV. In addition, CRCC detection codes $CR_0$ and $CR_1$ are placed after the line numbers $LN_0$ and $LN_1$.

In the HDVS system, since the number of effective lines in the vertical direction is 1125, the line number LN can be represented with 11 bits. FIG. 8 shows an example of a bit assignment of line numbers $LN_0$ and $LN_1$ of which the line number LN is represented by two bytes. In this example, with 11 bits of all bits of $LN_0$ ($L_7$ to $L_0$) and three bits ($L_{10}$ to $L_8$) from the LSB of $LN_1$, the line number is represented. MSB of $LN_1$ represents the first field or the second field of the line. $L_6$ to $L_3$ of $LN_1$ are not used.

The coprocessor 12 supplies to an input filter 13 the 4:2:2 signal from which an audio signal is separated and to which data such as the line number is added. Alternatively, the 4:2:2 signal can be supplied directly from an input terminal 15 to the input filter 13. In this case, the digital audio signal is supplied to an audio signal processing circuit 16 through an input terminal 17.

The input filter 13 bandwidth-compresses the input signal. The input filter 13 is composed of for example one ASIC. The input filter 13 is connected to a memory 14. The clock signals of 74.25 MHz and 46.40625 MHz are supplied from the timing generator 30 to the input filter 13.

Line numbers $LN_0$ and $LN_1$ are extracted from the 4:2:2 signal supplied to the input filter 13. The input filter 13 bandwidth-compresses the 4:2:2 signal to a 3:1:1 signal. In other words, as shown in FIGS. 1B and 1C, eight samples of the luminance signal Y in the 4:2:2 signal are compressed to six samples of the luminance signal Y in the 3:1:1 signal. In addition, two samples of each of the color difference signals Pr and Pb in the 4:2:2 signal are compressed to one sample of each of the color difference signals Pr and Pb in the 3:1:1 signal.

The bandwidth-compressed signal is rearranged to the above-described signals Ch0 and Ch1 with a transmission rate of 46.40625 MHz. As shown in FIGS. 1C and 1D, the luminance signal Y is re-arranged every six samples $Y_0$, $Y_1$, $Y_2$, and so forth. The even samples $Y_0$, $Y_2$, $Y_4$, and so forth and the odd samples $Y_1$, $Y_3$, $Y_3$, and so forth of the luminance signal Y are assigned to the two channels, respectively. Likewise, the color difference signals Pr and Pb are assigned to even samples $Pr_0$, $Pr_2$, and so forth and $Pb_0$, $Pb_2$, and so forth and odd samples $Pr_1$, $Pr_3$, and so forth and $Pb_1$, Pb$_3$, and so forth. The odd samples and even samples of the luminance signal Y and the color difference signals Pr/Pb are arranged in series. The even samples and the odd samples are arranged to the signals Ch0 and Ch1, respectively.

The input filter 13 places the line numbers LN$_0$ and LN$_1$ to the signals Ch0 and Ch1, respectively, for each line. In addition, the input filter 13 calculates CRCC for the signals Ch0 and Ch1 and places a CRCC detection code thereto. The above-described process is performed by the input filter 13 with for example a predetermined area of the memory 14.

Since the parallel 4:2:2 signal is converted into signals Ch0 and Ch1 of which the luminance signal Y and the color difference signals Pr/Pb are arranged to the channels Ch0 and Ch1 in series, the clock frequency can be decreased 5/8 times from 74.25 MHz to 46.40625 MHz. In addition, the luminance signal Y and the color difference signals Pr/Pb can be processed at one clock frequency.

FIG. 7B shows an example of the format of the signals Ch0 and Ch1 of which the CRCC detection code CRCC and the line numbers LN$_0$ and LN$_1$ are placed to the channels Ch0 and Ch1, respectively. As described above, the clock frequency of each of the signals Ch0 and Ch1 is 46.4 MHz. One horizontal interval of the signals Ch0 and Ch1 is 1375 clock pulses. Among 1375 clock pulses, the effective pixels are for 1200 clock pulses. In this example, for simplicity, only the signal Ch0 will be described.

When the signal level of the horizontal synchronous signal Hsync0 corresponding to the signal Ch0 becomes high, one horizontal interval starts. The line numbers LN$_0$ and LN$_1$ are placed for two clock pulses. Thereafter, the luminance signal Y and color difference signals Pr/Pb that have been bandwidth-compressed are placed in series. After the luminance signal Y and color difference signals Pr/Pb for one line, the CRCC detection code is placed for one clock pulse. At the 1375th clock pulse after the horizontal synchronous signal Hsync of one horizontal interval, the next horizontal synchronous signal Hync is supplied for one clock pulse.

In the above description, the line numbers LN$_0$ and LN$_1$ are placed at the beginning of the effective video area. However, the present invention is not limited to such an example. Alternatively, the line numbers LN$_0$ and LN$_1$ can be placed at the end of the effective video area.

The horizontal synchronous signal Hsync is placed to each of the signals Ch0 and Ch1. The horizontal synchronous signals placed to the signals Ch0 and Ch1 are referred to as Hsync0 and Hsync1, respectively. This is because processes downstream of the input filter 13 are performed by different ASICs corresponding to the signals Ch0 and Ch1.

The input filter 13 outputs synchronous signals Fsync0 and Fsync1 (not shown in FIG. 4) corresponding to the signals Ch0 and Ch1, respectively. The synchronous signals Fsync0 and Fsync1 are frame-by-frame synchronous signals. However, with the line number LN placed to the signals Ch0 and Ch1, a frame change point can be easily obtained. Thus, the synchronous signals Fsync0 and Fsync1 can be omitted.

The input filter 13 outputs the signals Ch0 and Hsync0 and the signals Ch1 and Hysnc1. These signals are supplied to BRR (Bit Rate Reduction) encoder 18 and 19. The BRR encoders 18 and 19 are connected to memories 20 and 21, respectively. The BRR encoders 18 and 19 each perform an encoding process corresponding to for example DCT (Discrete Cosine Transform) method for the supplied signal and quantizes the resultant signal so as to compression-encode the signal with a predetermined compression rate. In this example, the picture compression rate is 1/4.4.

The BRR encoder 18 extracts the line numbers LN$_0$ and LN$_1$ from the supplied signal Ch0. When the encoder 18 compression-encodes the signal Ch0, it shuffles the signal Ch0 as DCT blocks (one DCT block is composed of for example (8×8 pixels)). The shuffled DCT blocks are written to predetermined addresses of the memory 20. The addresses of the memory 20 are controlled with the line number LN. Thus, even if lines becomes discontinuous in a vertical blanking interval, the position of the effective video area can be compensated.

The transmission frequencies of the luminance signal Y and the color difference signals Pr/Pb of each of the signals Ch0 and Ch1 are the same (namely, 46.40625 MHz). Thus, the structures of the BRR encoders 18 and 19 are the same. In addition, the clock frequencies of the BRR encoders are the same. Unless the number of gates of an ASIC is limited, the encoders 18 and 19 can be composed of one ASIC.

The signals Ch0 and Ch1 that have been compression-encoded by the BRR encoders 18 and 19 are supplied to an ECC (Error Corrected Coding) encoder 22 along with the respective horizontal synchronous signals Hsync. In addition, a digital audio signal that has been processed in a predetermined manner by the audio signal processing circuit 16 is supplied to the ECC encoder 22.

FIG. 9 shows a signal format used in an interface between the BRR encoders 18 and 19 and an ECC encoder 22. The frequency of the clock signal is 46.40625 MHz. As shown in FIG. 9C, the BRR encoders 18 and 19 output signals with a data width of eight bits. The BRR encoders 18 and 19 output these signals as sync blocks (each sync block corresponds to 219 clock pulses including ID0 and ID1 (one byte each). ID0 and ID1 are sync block numbers for identifying sync blocks.

In addition, the BRR encoders 18 and 19 output a synchronous signal SYNC along with the sync blocks. As shown in the lower portion of FIG. 9C, after a sync pulse corresponding to one clock pulse is output, one sync block is output.

As described above, on the magnetic tape 4, one frame is composed of 12 tracks. One segment is composed of two adjacent tracks with different azimuth angles. As shown in FIGS. 9A and 9B, each segment is composed of the signals Ch0 and Ch1. Each of the signals Ch0 and Ch1 is composed of 226 sync blocks. A gap with a predetermined length is placed between two segments. One sync block is placed every 1008 clock pulses. The other portion is blank.

Thus, the BRR encoders 18 and 19 intermittently output signals for 219 clock pulses of 1008 clock pulses. Consequently, for the remaining 789 clock pulses, the power consumption of the encoders 18 and 19 can be suppressed.

The ECC encoder 22 encodes the received signal with a product code as an error correction code using a memory 23 connected thereto. In other words, as described in the section of the related art, an outer code parity and an inner code parity are generated for data (for example, the signal Ch0) written to the memory 23 so as to encode the data with the product code. The size of data that completes the product code of the inner code and the outer code is referred to as error correction block.

The memory 23 is divided into for example two areas in which data is processed with the inner code and the outer code, respectively. Alternatively, processes with the inner code and the outer code can be performed by a particular accessing method of data. Instead of the memory 23, two memories that perform processes with the inner code and the outer code may be used.

FIGS. 10 and 11 are schematic diagrams showing an example of the structure of an error correction block. As shown in FIGS. 2 and 3, the digital video tape recorder records a signal as helical tracks to the magnetic tape 4. The error correction code encoding process performed by the ECC encoder 22 is performed for each helical track.

Figure 10A:
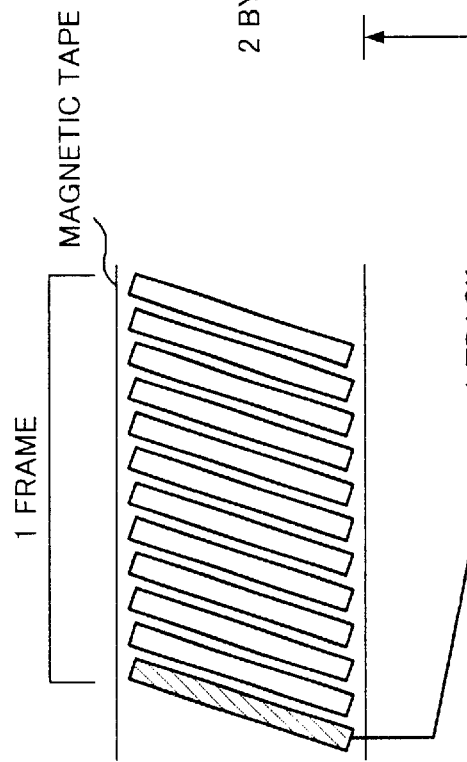
FIG. 10 is a schematic diagram showing an example of the structure of an error correcting block.
Figure 10B:
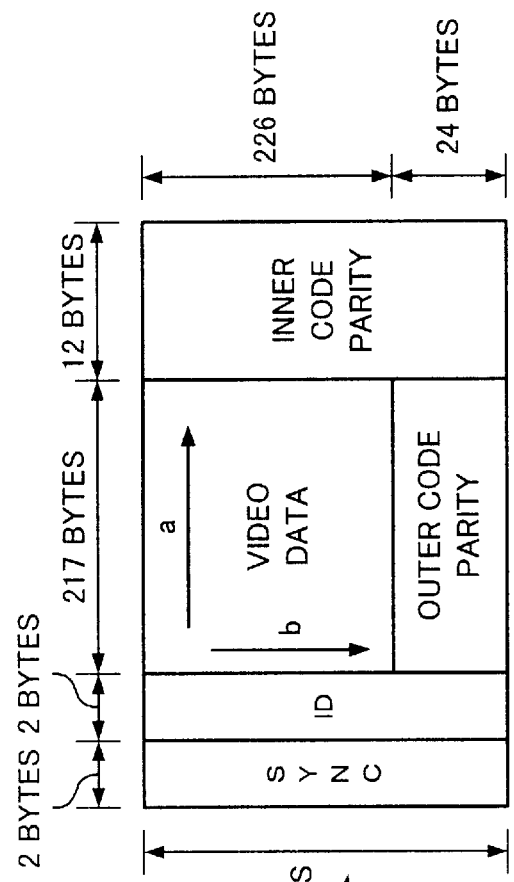

In the example of video data shown in FIG. 10, one track of 12 tracks (one frame) shown in FIG. 10A is one error correction block shown in FIG. 10B. When all 226 sync blocks shown in FIG. 9B are input to the ECC encoder 22, a data arrangement of 217 bytes×226 bytes shown in FIG. 10B is formed. The data of each column (in the direction b) is encoded with (250, 226) Reed Solomon code. Thus, an outer code parity of 24 bytes is generated. The video data and the outer code parity of each line (in the direction a) are encoded with (229, 219) Reed Solomon code. Thus, an inner code parity of 12 bytes is generated. At this point, sync data and ID of two bytes each are placed at the beginning of each line of data. The sync data and ID are included in the process with the inner code.

Figure 11B:
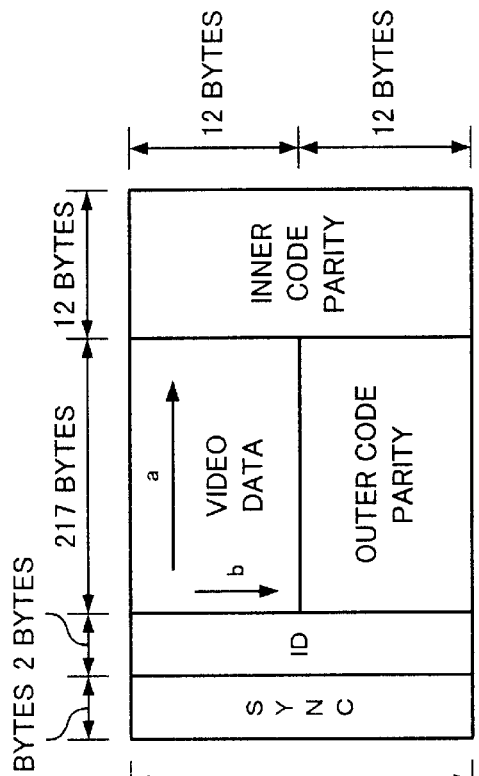
FIG. 11 is a schematic diagram showing an example of the structure of an error correcting block.
Figure 11A:
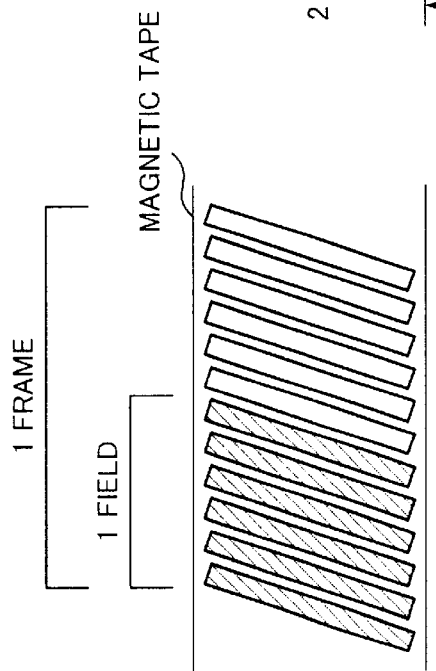

FIG. 11 is a schematic diagram showing an example of the structure of an error correction block of audio data. As shown in FIG. 11A, for audio data, one error correction block shown in FIG. 11B is composed of six tracks of 12 tracks of one frame. Audio data with a data arrangement of for example 217 bytes×12 bytes is encoded in the direction b with for example (24, 12) Reed Solomon code. Thus, an outer code parity of 12 bytes is generated. The video data and the outer code parity are encoded in the direction a with for example (229, 219) Reed Solomon code. Thus, an inner code parity of 12 bytes is generated. At this point, sync data and ID are placed at the beginning of each line. The sync data and ID are included in the process with the inner code.

Figure 12:
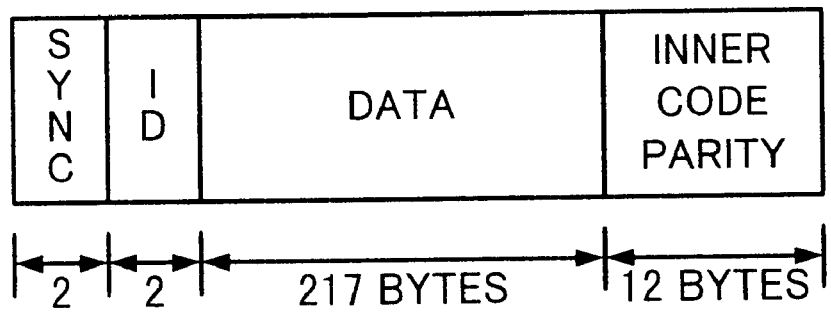
FIG. 12 is a schematic diagram showing the structure of one sync block of an error correcting block in the case of video data.

FIG. 12 is a schematic diagram showing an example of the structure of one sync block of the error correction block for video data. The first two bytes of the sync block are sync data. The next two bytes are ID. The ID represents the sequence number (sync block number) of one track of one sync block. The ID is generated corresponding to ID0 and ID1 placed at the beginning of a sync block as shown in FIG. 9C. The ID is followed by video data (or outer code parity) of 217 bytes and an inner code parity. Record data on the magnetic tape 4 is composed of a sequence of sync blocks.

An output signal of the ECC encoder (namely, a signal that has been encoded with error correction code) is assigned for each error correction block to channels A, B, C, and D at a record rate frequency of the magnetic tape 4. The signals are output as two signals for channels A/C and channels B/D.

In other words, as shown in FIG. 9B, an error correction block composed of the first 226 sync blocks of the signal Ch0 supplied from the BRR encoder 18 becomes a signal on the channel A. An error correction block composed of the next 226 sync blocks becomes a signal on the channel C. The ECC encoder 22 alternately outputs the signal on the channel A and the signal on the channel C. Likewise, error correction blocks of the signal Ch1 supplied from the BRR encoder 22 become signals on the channels B and D. The ECC encoder 22 alternately outputs the signals on the channels B and D.

The signal on the channel A/C and the signal on the channel B/D are supplied to a record driving circuit 24. The record driving circuit 24 modulates the two signals, amplifies the modulated signals, and outputs the amplified signals so that the signals can be recorded to the magnetic tape 4. The signal on the channel A/C and the signal on the channel B/D are supplied to the magnetic head 2A/2C and the magnetic head 2B/2D, respectively, and recorded to the magnetic tape 4.

In FIG. 4, for preventing redundancy of description, the recording magnetic heads 2A, 2B, 2C, and 2D are simplified as two magnetic heads 2A or 2C and 2B or 2D. The signal paths corresponding to the four magnetic heads are simplified as two paths. The record driving circuit 24 has a selecting switch that select channels corresponding to the rotation of the rotating drum 1. Whenever the rotating drum 1 is rotated by 180°, the selecting switch selects the channels A and C or the channels B and D.

Next, with reference to FIG. 5, the process performed in the reproducing system will be described. Reproducing magnetic heads 3A, 3B, 3C, and 3D reproduce a signal recorded on the magnetic tape 4. As described above, the magnetic heads 3A, 3B, 3C, and 3D reproduce tracks A, B, C, and D, respectively. A reproduction signal (signal A/C) reproduced by the magnetic heads 3A and 3C is supplied to an equalizer 40. Likewise, a reproduction signal (signal B/D) reproduced by the magnetic heads 3B and 3D is supplied to an equalizer 47. Next, the signal A/C supplied to the equalizer 40 will be described.

In FIG. 5, for preventing redundancy of description, the magnetic heads 3A, 3B, 3C, and 3D are simplified as two magnetic heads 3A or 3C and 3B or 3D. In addition, signal paths corresponding to the four magnetic heads are simplified as two paths. Each of equalizers 40 and 47 has a selecting switch that selects channels corresponding to the rotation of the rotating drum 1 by 180°. Thus, the equalizer 40 alternately processes a reproduction signal reproduced by the magnetic heads 3A and 3C. Likewise, the equalizer 47 alternately processes a reproduction signal reproduced by the magnetic heads 3B and 3D.

In the structure shown in FIG. 5, the timing generator 30 for the recording system shown in FIG. 4 is used in common.

The equalizer 40 outputs the signal A/C and a reproduction clock signal corresponding to the rotation of the rotating head 1. The signal A/C and the reproduction clock signal are supplied to an ECC decoder 41. The ECC decoder 41 also receives the clock signal of 46.40625 MHz from the timing generator 30. The ECC decoder 41 is connected to a memory 42. The ECC decoder 41 decodes the channel signal A/C with an error correction code using the memory 42.

In other words, the signal A/C reproduced for each track and supplied for each error correction block is decoded with error correction code of an inner code and an outer code. The resultant signal A/C is output for each sync block corresponding to the clock signal of 46.40625 MHz. The resultant signal A/C is supplied to a BRR decoder 43. In other words, the signal A/C is transmitted in the format shown in FIG. 9 between the ECC decoder 41 and the BRR decoder 43.

In addition, the ECC decoder 41 generates a frame synchronous signal Fsync0 and a synchronous signal SYNC. The synchronous signal Fsync0 and the synchronous signal SYNC are supplied to the BRR decoder 43.

The BRR decoder 43 receives the clock signal of 46.40625 MHz from the timing generator 30. The BRR decoder 43 can detect the beginning of each frame corresponding to ID0 and ID1 placed at the beginning of a sync block. The BRR decoder 43 performs an inverse DCT process and a deshuffling process for the signal A/C with the memory 44 so as to decode a compressed code.

The decoded signal A/C is a signal of which the luminance signal Y and the color difference signals Pr/Pb are arranged in series as shown in FIG. 7B corresponding to the clock signal of 46.40625 MHz. The line numbers $LN_0$ and $LN_1$ are placed to each line. The line numbers are added when data of each DCT block is written to a particular position of the memory 44 corresponding to the decoded ID and the data is read from the memory 44. In other words, an output signal of the BRR decoder 43 corresponding to the signal A/C is equivalent to the signal Ch0 of the recording system. Hereinafter, the signal corresponding to the signal A/C is referred to as signal Ch0. The signal Ch0 is supplied to a concealing circuit 45 that compensates a video signal.

The BRR decoder 43 also generates the synchronous signal Hsync0. The synchronous signal Hsync0 is supplied to the concealing circuit 45.

The above-described process applies to the signal B/D received from the equalizer 47. In other words, the signal B/D supplied from the equalizer 47 to the ECC decoder 48 is decoded with error correction code using a memory 49. Along with the decoded signal B/D, synchronous signals Fsync and SYNC are output from an ECC decoder 48 to a BRR decoder 50. The BRR decoder 50 decodes the compressed code of the signal B/D with a memory 51. The decoded signal B/D is a signal of which the luminance signal Y and the color difference signals Pr/Pb are arranged in series corresponding to the clock signal of 46.40625 MHz. Line numbers $LN_0$ and $LN_1$ are added to the resultant signal. The resultant signal is equivalent to the signal Ch1 of the recoding system. Hereinafter, the signal corresponding to the signal B/D is referred to as signal Ch1. The signal Ch1 is supplied to the concealing circuit 45. In addition, a synchronous signal Hsync1 generated by the decoder 50 is supplied to the concealing circuit 45.

The ECC decoders 41 and 48 and the BRR decoders 43 and 50 are composed of respective ASICs that have the same standard.

The concealing circuit 45 is composed of for example one ASIC. The concealing circuit 45 compensates a reproduction signal that has an error due to for example a scratch on the magnetic tape when the error cannot be corrected by the ECC decoder 41 or 48. When the ECC decoder 41 or 48 cannot correct an error of a signal and thereby a lost portion takes place, the concealing circuit 45 interpolates the lost portion in a predetermined manner.

The compensated signals Ch0 and Ch1 are supplied to a post filter 53. The synchronous signals Hsync0 and Hsync1 for the channels A/C and the channels B/D are unified as a synchronous signal Hsync. The synchronous signal Hsync is supplied to the post filter 53.

The post filter 53 is composed of for example one ASIC. The post filter 53 suppresses irregular noise that takes place in a picture compressing/decompressing process of the BRR decoders 43 and 50 and the BRR encoders 18 and 19. The post 25 filter 53 performs the process with a memory 54 corresponding to the clock signal of 46.40625 MHz. The post filter 53 outputs the signals Ch0 and Ch1 and the synchronous signal Hsync to an output filter 55.

The output filter 55 is composed of for example one ASIC. The output filter 55 receives the clock signal of 46.40625 MHz and the clock signal of 74.25 MHz from the timing generator 30. The output filter 55 converts the received signals Ch0 and Ch1 into a 4:2:2 signal with a memory 56 corresponding to the clock signals.

In other words, the signals Ch0 and Ch1 supplied corresponding to the clock signal of 46.40625 MHz are re-sampled corresponding to the clock signal of 74.25 MHz. The resultant signals are temporarily written to for example the memory 56. The signals are interpolated so that the ratio of sampling frequencies of the luminance signal, the color difference signal Pr, and the color difference signal Pb becomes 4:2:2. The resultant 4:2:2 signal is supplied to a video processor 57. In an interface between the output filter 55 and the video processor 57, the signal format shown in FIG. 7A is used.

The video processor 57 performs predetermined processes (for example, adjusts gain and offset) for the supplied 4:2:2 signal with a memory 58 connected thereto. The resultant 4:2:2 signal is output to an output terminal 59.

After the audio signal is decoded with error correction code by the ECC decoders 41 and 48, the resultant audio signal is supplied to an audio processor 52. The audio processor 52 performs a predetermined process for the audio signal. The resultant audio signal is supplied to a digital audio output terminal 63.

The 4:2:2 signal that is output from the video processor 57 can be output as a serial digital A/V signal. The 4:2:2 signal is supplied from the video processor 57 to a coprocessor 60. In addition, the digital audio signal is supplied from the audio processor 52 to the coprocessor 60. The coprocessor 60 places the digital audio signal in the 4:2:2 signal corresponding to the clock signal of 74.25 MHz and adds predetermined auxiliary data in the predetermined format thereto. An output signal of the coprocessor 60 is supplied to a P/S converter 61.

The P/S converter 61 converts the 4:2:2 signal as the parallel digital signal into a serial digital A/V signal at a transmission rate of 1.485 Gbps. The 4:2:2 signal that has been converted into the serial signal in the format shown in FIG. 6 by the P/S converter 61 is output to a serial digital A/V output terminal 62.

In the structure of the reproducing system, interface signals from the BRR decoders 43 and 50 to the output filter 55 are processed in the same format (see FIG. 7B) corresponding to the clock signal of 46.40625 MHz. In addition, the BRR decoders 43 and 50, the concealing circuit 45, the post filter 54, and the output filter 55 operate at a transmission rate of 46.40625 MHz.

In addition, the line numbers $LN_0$ and $LN_1$ are added to output signals of the BRR decoders 43 and 50. The signals with the line numbers $LN_0$ and $LN_1$ are supplied to downstream circuits. Thus, even if the continuity of line numbers is lost due to a trouble of hardware in any downstream circuit, the lost line numbers and the abnormality of the hardware can be easily detected.

In the above-described example, the present invention is applied to the 1125 lines/60 Hz system. However, the present invention is not limited to such a system. For example, the present invention can be easily applied to the NTSC system with a field frequency of 59.94 Hz. In this case, the frequencies of interface signals and clock signals are divided by 1.001 (=60/59.94).

In addition to the recording/reproducing apparatus that have been described, the signal processing method according to the present invention can be applied to a predetermined process for a digital video signal (for example, an apparatus that provides a signal with an effect).

As described above, according to the present invention, since line numbers are added to a signal to be transmitted, even if an input signal becomes discontinue and thereby the length of blanking intervals varies or the position of a picture deviates, it can be easily compensated. Likewise, even if a signal transmission becomes discontinuous due to an abnormal operation of the apparatus, it can be detected.

In addition, according to the present invention, since the frequencies of interface signals of individual ASICs are unified to 46.40625 MHz, the structure of the apparatus can be simplified.

Moreover, according to the present invention, the bandwidth of frequencies of component signals of a video signal is compressed to 3:1:1. In addition, the frequency of interface signals of individual ASICs is 46.40625 MHz that is lower than that of a conventional 4:2:2 signal. Thus, the power consumption of the apparatus can be decreased.

Furthermore, since signals are processed in two systems that have the same format, the structures of ASICs of compressing portions become the same. Thus, the cost of the apparatus can be decreased. In addition, the hardware scale of an ASIC of the compressing portion can be decreased. Thus, the size of the apparatus can be decreased.

Moreover, the frequencies of interface signals of individual ASICs are unified to 46.40625 MHz. Thus, signal paths of individual ASICs can be flexibly selected. Consequently, the reliability of the apparatus can be effectively checked and the apparatus can effectively be debugged.

What is claimed is:

1. A recording apparatus for bandwidth-compressing a digital video signal, compression-encoding the resultant signal, and recording the resultant signal to a record medium, comprising:

compression-encoding means for compression-encoding a supplied digital video signal,
wherein a first and second line number representing a representive line number are added at the beginning of the horizontal interval but at the end of the effective video area of the digital video signal supplied to said compression-encoding means so that said respective line number may be used to control the data sequence,
whereby all of the bits of said first line number and a plurality of the least significant bits of said second line number represent said respective line number.

2. The recording apparatus as set forth in claim 1, further comprising:

bandwidth-compressing means for bandwidth-compressing the digital video signal and supplying the resultant signal to said compression-encoding means,
wherein said bandwidth compressing means bandwidth-compresses the digital video signal into a 3:1:1 signal.

3. The recording apparatus as set forth in claim 2,
wherein said bandwidth-compressing means rearranges a data sequence of the 3:1:1 signal to two-channel signals with the same transmission rate and the same data arrangement.

4. A reproducing apparatus for reproducing a digital video signal that has been bandwidth-compressed, compression-encoded, and recorded to a record medium, comprising:

decoding means for decoding compressed code of a reproduction digital video signal reproduced from the record medium,
wherein the first and second line number representing a respective line number generated corresponding to the reproduction digital video signal are added at the beginning of the horizontal interval but at the end of the effective video area of an output signal of said decoding means,
whereby all of the bits of said first line number and a plurality of the least a significant bits of said second line number represrnt said respective line number.

5. The reproducing apparatus as set forth in claim 4,
wherein said decoding means outputs the reproduction digital video signal as two-channel signals with the same transmission rate and the same data arrangement.

6. A recording/reproducing apparatus for bandwidth-compressing a digital video signal, compression-encoding the resultant signal, recording the resultant signal to a record medium, and reproducing the recorded digital video signal, comprising:

compression-encoding means for compression-encoding a supplied digital video signal;
recording means for recording the compression-encoded digital video signal to the record medium;
reproducing means for reproducing the digital video signal recorded on the record medium; and
decoding means for decoding compressed code of the reproduction digital video signal reproduced from the record medium;
wherein in a recording mode, a first and second line number representing a respective line number are added at the beginning of the horizontal interval but at the end of the effective video area of the digital video signal supplied to said compression-encoding means and in a reproducing mode, line numbers generated corresponding to the reproduction digital video signal are added to an output signal of said decoding means,
whereby all of the bits of said first line number and a plurality of the least significant bits of said second line number represent said respective line number.

7. A recording apparatus for bandwidth-compressing a digital video signal, compression-encoding the resultant signal, and recording the resultant signal to a record medium, comprising the steps of:

compression-encoding a supplied digital video signal,
wherein a first and second line number representing a respective line number are added at the beginning of the horizontal interval but at the end of the effective video area the digital video signal supplied at the compression-encoding step,
whereby all of the bits of said first line number and a plurality of the least significant bits of said second line number represent said respective line number.

8. A reproducing method for reproducing a digital video signal that has been bandwidth-compressed, compression-encoded, and recorded to a record medium, comprising the steps of:

decoding compressed code of a reproduction digital video signal reproduced from the record medium,
wherein a first and second line number representing a respective line number generated corresponding to the digital video signal are added at the beginning of the horizontal interval but at the end of the effective video area of an output signal at the decoding step,
whereby all of the bits of said first line number and a plurality of the least significant bits of said second line number represent said respective line number.

9. A recording/reproducing method for bandwidth-compressing a digital video signal, compression-encoding the resultant signal, recording the resultant signal to a record medium, and reproducing the recorded digital video signal, comprising the steps of:

compression-encoding a supplied digital signal;
recording the compression-encoded digital video signal to the record medium;
reproducing the digital video signal recorded to the record medium; and
decoding compressed code of the reproduction digital video signal reproduced from the record medium,
wherein the recording mode, a first and second line number are added to the digital video signal supplied at the compression-encoding step and in a reproducing mode, line numbers generated corresponding to the reproduction digital video signal are added to the beginning of the horizontal interval but at the end of the effective video area an output signal at the decoding step, whereby all of the bits of said first line number and a plurality of the least significant bits of said second line number represent said respective line number.

* * * * *